United States Patent [19]

Zhou

[11] Patent Number: 5,688,201

[45] Date of Patent: Nov. 18, 1997

[54] TRACTION DRIVE

[75] Inventor: Rao-Sheng Zhou, Canal Fulton, Ohio

[73] Assignee: The Timken Company, Canton, Ohio

[21] Appl. No.: 510,595

[22] Filed: Aug. 3, 1995

[51] Int. Cl.$^6$ .................................................. F16H 15/48
[52] U.S. Cl. ........................... 475/183; 475/193; 475/194
[58] Field of Search ................................. 475/183, 184, 475/193, 195

[56] References Cited

U.S. PATENT DOCUMENTS

| | | | |
|---|---|---|---|
| 1,737,997 | 12/1929 | Garrard | 475/183 |
| 3,283,614 | 11/1966 | Hewko | 475/195 |
| 5,021,035 | 6/1991 | Zhou | 475/183 |
| 5,025,671 | 6/1991 | Kraus | 475/183 X |

FOREIGN PATENT DOCUMENTS

| | | | |
|---|---|---|---|
| 180346 | 7/1990 | Japan | 475/183 |
| 108418 | 9/1943 | Switzerland | 475/183 |
| 838192 | 6/1981 | U.S.S.R. | 475/183 |
| 1015166 | 4/1983 | U.S.S.R. | 475/183 |

*Primary Examiner*—Khoi Q. Ta
*Attorney, Agent, or Firm*—Polster, Lieder, Woodruff & Lucchesi, L.C.

[57] ABSTRACT

A traction drive of planetary configuration includes a cone, a pair of cups surrounding the cone, transfer rings located between the cone and the cups, and a cage that positions the transfer rings. The cone is unitary and has a pair of raceways which are presented outwardly and taper downwardly toward each other. The two cups have tapered raceways which are presented inwardly toward the cone raceway. The transfer rings on their peripheral surfaces are tapered and slightly crowned. The cage includes end disks which lie beyond the ends of the transfer rings and studs which connect the end disks and further serve as journals for the transfer rings, thus maintaining the rings at equal circumferential intervals. The two cups are held together, and springs, either at the rollers or along the cups, urge the tapered raceways of the cone and cups and the tapered peripheral surfaces of the transfer rings snugly together. The spring force is supplemented with an axial force derived from the torque transferred by the drive. Power may be applied at the cone or at the cups or at the cage, and may be delivered at either of the remaining two components.

20 Claims, 3 Drawing Sheets

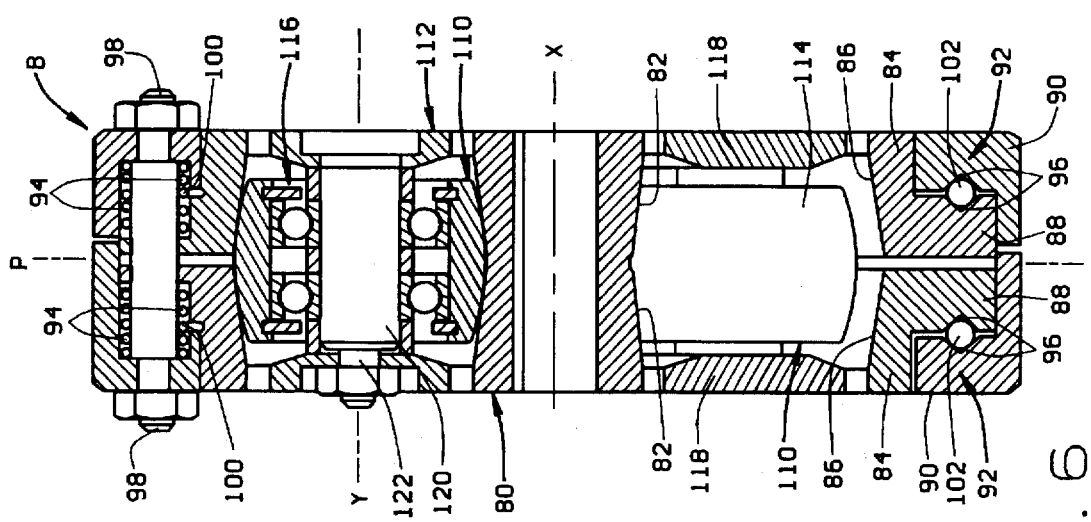
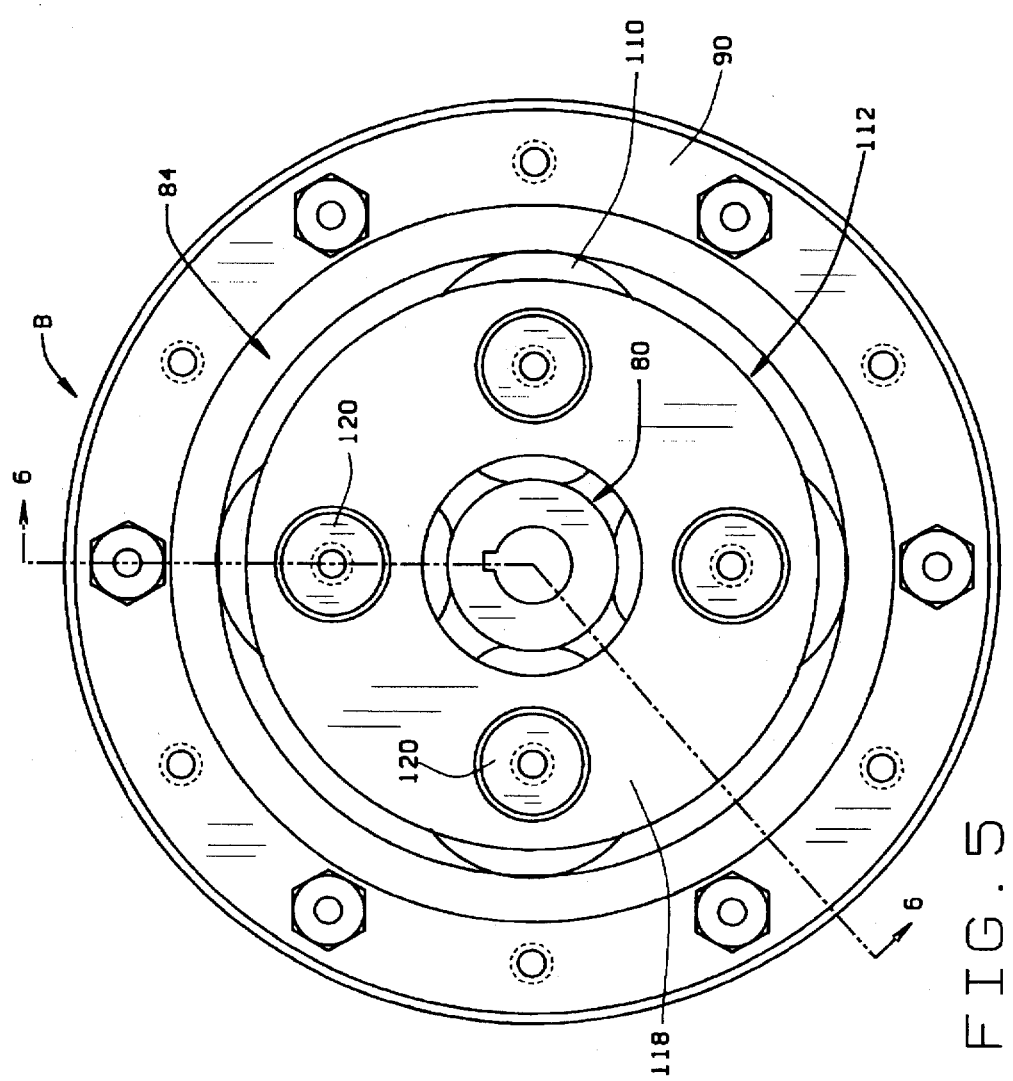

TRACTION DRIVE

BACKGROUND OF THE INVENTION

This invention relates in general to traction drives and more particularly to a traction drive that operates as a planetary system.

Planetary transmissions typically rely on meshing gears to transfer power—indeed, several planet gears between a sun gear and a ring gear. This arrangement distributes the load through the several planet gears, enabling the system to accommodate higher loads, and further provides several speed ratios, depending on where power is supplied to the system and where it is taken from the system. But gear systems inherently contain backlash, are somewhat noisy, and set up vibrations. Moreover, the meshing gear teeth slide across each other, and the friction generated detracts from the efficiency of the system.

Planetary friction drives, which rely solely on friction between rotating components to transfer power, do not have backlash and further operate with less noise and vibration than planetary gear systems, and in that sense they are superior to planetary systems. Furthermore, they have the capacity to operate at high velocity and with high efficiency. Even so, planetary systems of current design are somewhat complex and expensive to manufacture, and occupy considerable space.

The present invention resides in a traction drive of planetary configuration which utilizes minimum parts of simple configuration. The drive operates at high efficiency, and has the capacity to transfer considerable torque. Moreover, it is quiet and contains no backlash. It is also light in weight and highly compact, having a narrow profile and indeed a disk-like appearance. The invention also consists in the parts and in the arrangements and combinations of parts hereinafter described and claimed.

DESCRIPTION OF DRAWINGS

In the accompanying drawings which form part of the specification and wherein like numerals and letters refer to like parts wherever they occur:

FIG. 5 is an end elevational view of a modified traction drive constructed in accordance with and embodying the present invention;

FIG. 6 is a sectional view of the modified traction drive taken along line 6—6 of FIG. 5.

DETAILED DESCRIPTION

Figure 1:
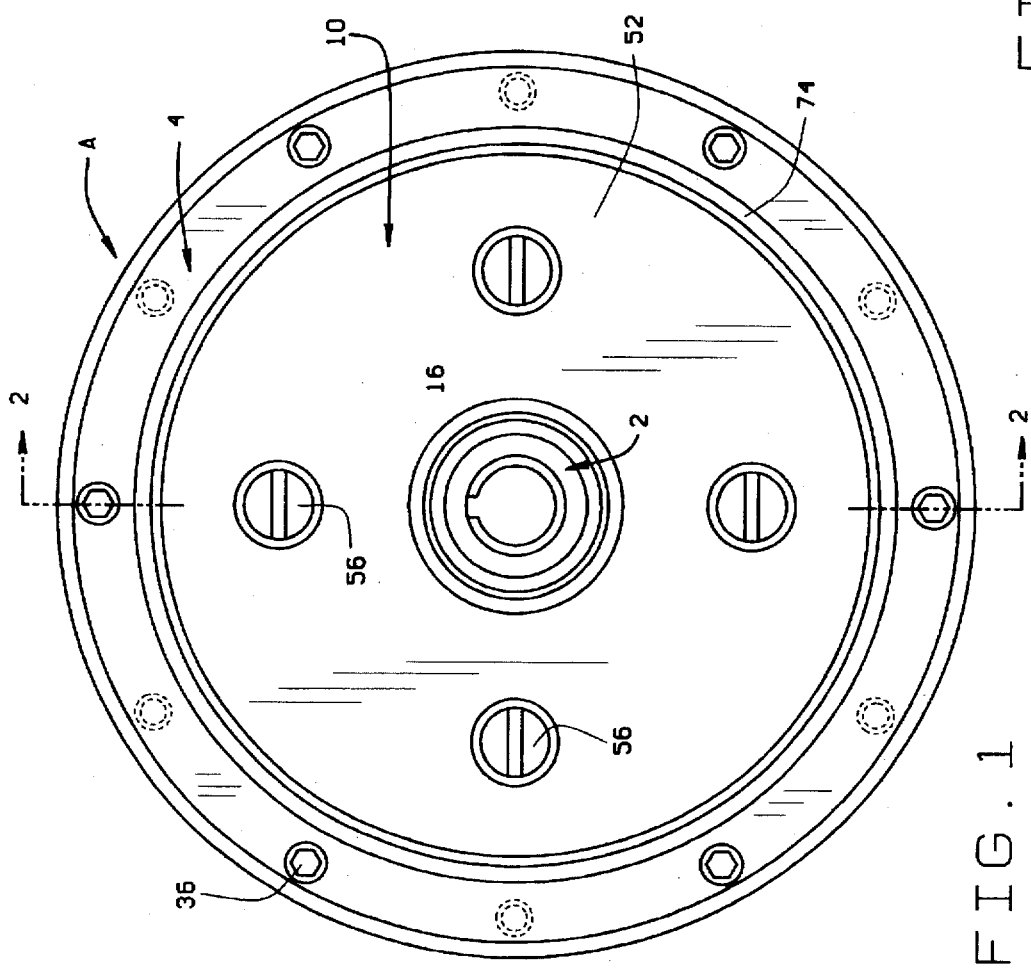
FIG. 1 is an end elevational view of a traction drive constructed in accordance with and embodying the patent invention.

Referring now to the drawings, a traction drive A (FIGS. 1–3), which operates as a planetary system, is light in weight and highly compact for the torque which it has the capacity to transfer, and inasmuch as it relies on friction surfaces for the transfer, it operates quietly, with low vibration and no backlash. The traction drive A basically includes a cone 2, which corresponds to a sun gear in a planetary gear system, a pair of cups 4, which correspond to the ring gear in a planetary system, and transfer rings 6 which are located between the cone 2 and cup 4 and correspond to planet gears in a planetary gear system. In addition, the traction drive A has a cage 10 which organizes the transfer rings 6 such that they remain at equal intervals in the annular space between the cone 2 and cups 4, and further isolate that annular space to exclude contaminants from it.

The traction drive A serves as a transmission for transmitting power and torque, and that power may be delivered to the cone 2 or the cups 4 or the cage 10 and extracted from either one of the remaining two components. The cone 2 and cups 4 are arranged concentrically around a center axis X, while the transfer rings 6 rotate about remote axes Y which lie equidistantly from the axis X and may move in an orbit around the axis X. The transfer rings 6 exist in pairs on each axis Y and as a consequence lie in two rows a and b which are separated by a center plane p that is perpendicular to the axis X and the axes Y as well.

The cone 2, which is unitary, has a throughbore 16, which imparts a ring-like configuration to it, and also a pair of raceways 18 which are presented outwardly away from the axis X. The raceways 18 taper downwardly toward the center plane p where they merge. Their large diameter ends lie along shallow rabbets 20 at the ends of the cone 2.

One cup 4 serves the row a while the other cup serves the row b. The cups 4 abut along the center plane p, and each has a tapered raceway 28 which tapers downwardly away from the center plane p. The raceway 28 for the cup 4 of the row a encircles and faces one of the raceways 18 of the cone 2, while the raceway 28 on the cup 4 for the row b encircles and faces the other raceway 18 on the cone 2. Each cup 4 also has a shallow rabbet 30 at the small end of its raceway 28, so that the rabbets 30 on the cups 4 lie at the ends of the cups 4 and encircle the rabbets 20 on the cone 2. At their opposite ends the cups 4 interlock, the one cup 4 having an axially directed rib 32 and the other, another rabbet 34 which receives the rib 32. The interlock serves to maintain the two cups 4 in axial alignment. The two cups 4 are held together with machine screws 36 which pass through the one and thread into the other.

Figure 2:
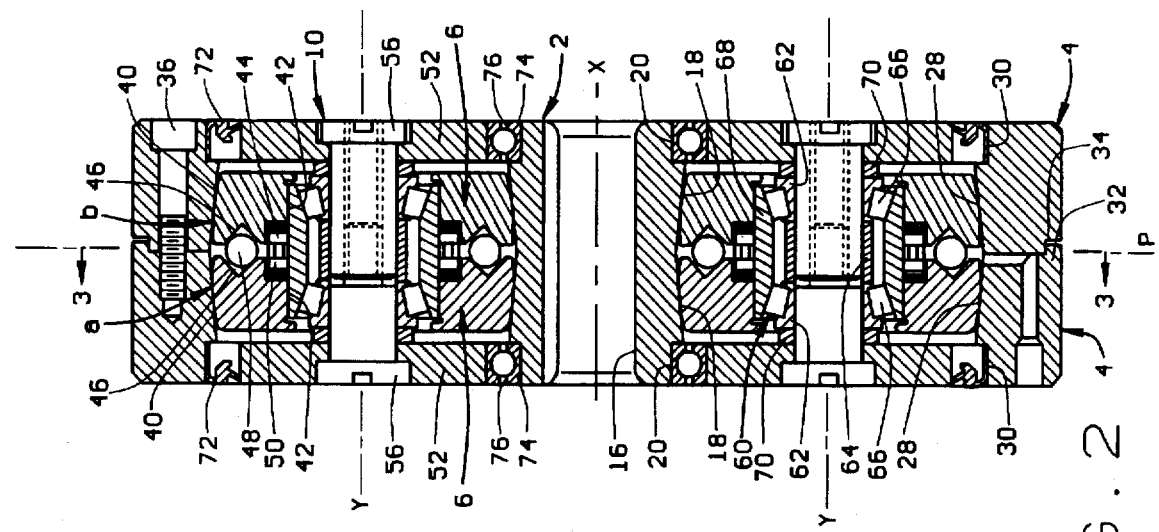
FIG. 2 is a sectional view taken along line 2—2 of FIG. 1.
Figure 4:
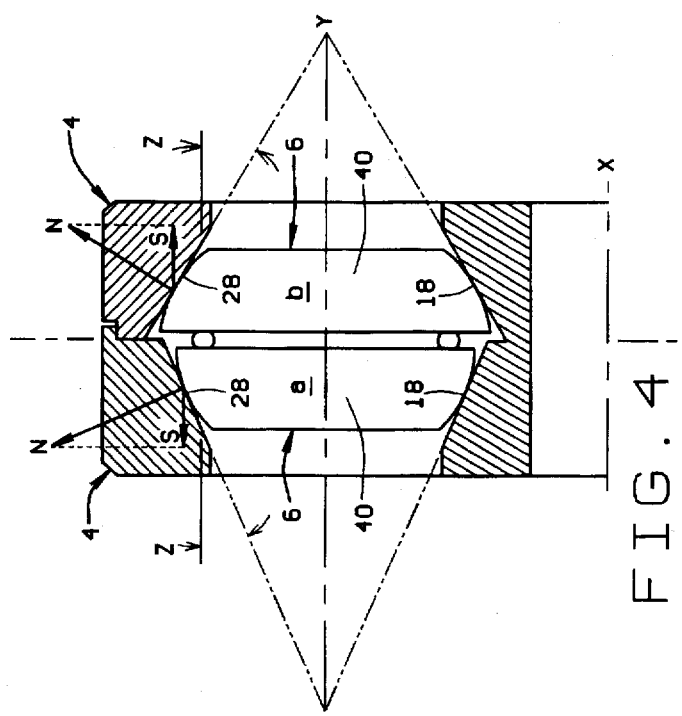
FIG. 4 is a half sectional view similar to FIG. 2, but showing the angles of the raceways and crowns of the rings exaggerated and also showing the forces acting in the drive to effect high torque transfer.
Figure 3:
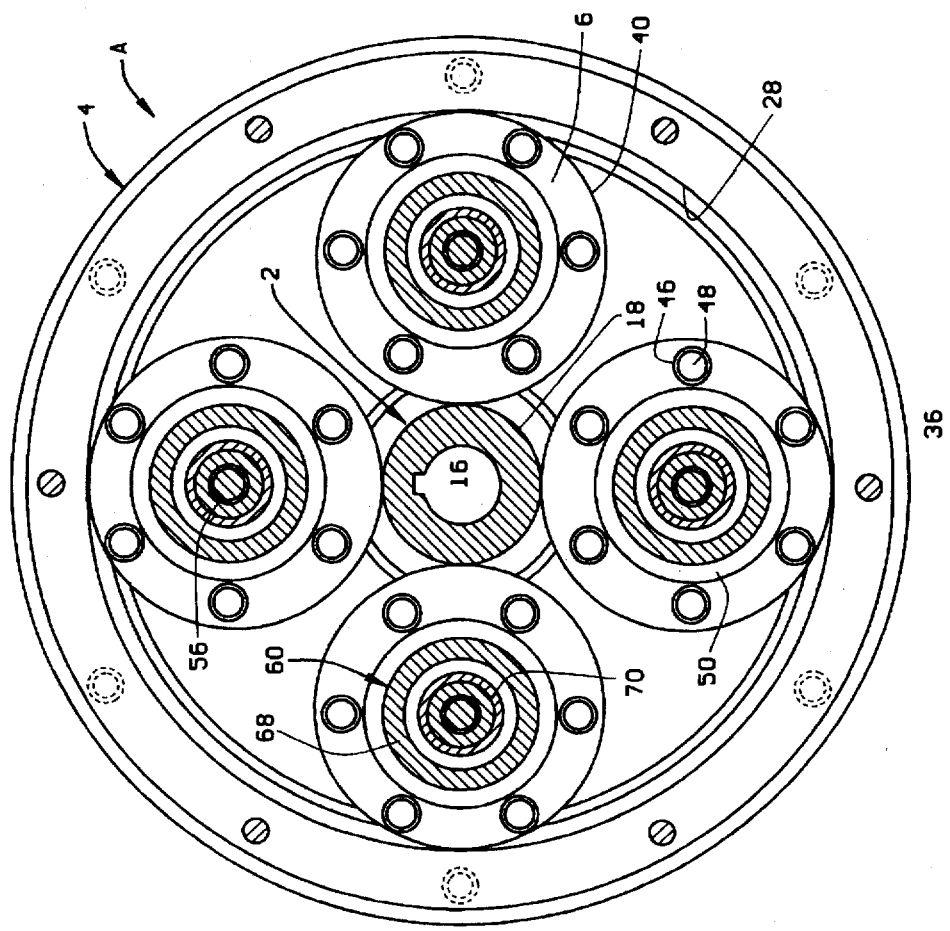
FIG. 3 is a sectional view taken along line 3—3 of FIG. 2.

The transfer rings 6 are arranged in pairs between the cone 2 and the cups 4, with the rings 6 of each pair being along a single remote axis Y which lies parallel to the center axis X (FIG. 2). Each transfer ring 6 has a tapered, yet slightly crowned or convex, peripheral surface 40, with the curvature of that surface being such that the surface 40 contacts the raceway 28 for the cup 4, within which it is confined, and the corresponding raceway 18 on the cone 2 generally midway between the ends of those raceways 18 and 28. Actually, the points of contact, or more accurately the regions of contact, between the tapered peripheral surfaces 40 of the transfer rings 6 and the raceways 18 and 28 of the cone 2 and cups 4, respectively, are somewhat elliptical, although quite narrow, this being by reason of the slight crown on the tapered surface. The geometry is such that the envelopes for the raceways 18 and 28 meet along the remote axes Y for the transfer rings 6 (FIG. 4).

Each transfer ring 6 has a center bore 42 and a counterbore 44, with the latter opening toward the center plane p. The bore 42 and counterbore 44 for the ring 6 have their common axis along the remote axis Y for the ring 6, and the peripheral surface 40 for the ring 6 lies concentric to them. A slight separation or space exists between the transfer rings 6 of each pair, and in this region each ring 6 of a pair has several conical pockets 46 arranged at equal circumferential intervals. For each pair of transfer rings 6, the pockets 46 for the ring 6 in the row a are presented opposite the pockets 46 for the ring 6 for the row b. Each set of opposed pockets 46 holds a spacer ball 48, and owing to the conical configuration of the pockets 46, the balls 48 are captured between the two transfer rings 6. Thus, the balls 48 separate the rings 6 of any pair. Moreover, the transfer rings 6 of any pair within their counterbores 44 contain a wave spring 50 which urges the rings 6 of the pair apart.

The cage 10 includes a pair of end disks 52 (FIG. 2) which lie between the cone 2 and cups 4 with their end faces generally flush with the ends of the cone 2 and cups 4. In addition, the cage 10 has studs 56 which extend through the transfer rings 6 to provide axles about which the rings 6 revolve and to further unite the two end disks 52. Each stud 56 has a head which fits into its end disk 52 and a shank or main body which projects into the space between the two disks 52—indeed, into the bore 42 of one of the transfer rings 6. In effect, the studs 56 are arranged in pairs along the axes Y, with the studs 56 for the one disk 52 being threaded into the studs 56 for the other disk 52. Each pair of studs 56 is fitted with a double row tapered roller bearing 60 on which the two transfer rings 6 for those studs 56 are mounted. Each tapered roller bearing 60 has a pair of cones 62 which fit snugly over the stud 56 and a spacer sleeve 64 located between the cones 62. The cones 62 have their back faces presented outwardly toward the end disks 52, and as a consequence their raceways tapered downwardly toward the spacer sleeve 64. In addition, each bearing 60 includes tapered rollers 66 arranged in two circumferential rows, there being a separate row around the raceway of each cone 62. Finally, the bearing 60 has a double cup 68, that is a unitary cup having two raceways—one for each row of rollers 66. While the studs 56 hold the end disks 52 together, the end disks 52 do not bear against the cones 62 of the bearing 60. Instead, the studs 56 are fitted with end spacers 70 that lie between the backfaces of the cones 62 and the inside faces at the end disks 52. The engaged studs 56 of each pair clamp the two cones 62 and the spacer sleeve 64 as well as the end spacers 70 for each bearing 60 tightly between the two end disks 52. The spacer sleeve 64 of each bearing 60 controls the setting of the bearing 60, that is to say, whether or not it operates under a condition of end play or preload.

The double cup 68 of each bearing 60 has an outwardly presented cylindrical surface, and it is along this surface that the cup 68 is fitted to the pair of transfer rings 6 that the bearing 60 carries. The double cup 68 fits snugly into the bore 42 for the transfer ring 6 of the row b and somewhat loosely into the bore 42 for the ring 6 of the row a. The fit of the ring 6 for the row a is just loose enough to enable that ring 6 to both rotate and shift axially a short distance on the cylindrical outer surface of the bearing cup 68. Indeed, when the loose ring 6 of the row a rotates relative to the fixed ring 6 of the row b, the balls 48 in the pockets 46 will ride slightly up the conical surfaces of pockets 46 and drive the loose ring 6 axially away from the fixed ring 6.

Other types of bearings may be used in lieu of the tapered roller bearings 60, particularly in smaller units. For example, ball bearings or even sleeve bearings may be substituted for the tapered roller bearings 60.

The transfer rings 6 contact the cups 4 along the raceways 28 of the cups 4 (FIG. 2). In this regard, the tapered peripheral surfaces 40 of the rings 6 for the row a contact the raceway 28 of the one cup 4, whereas the tapered peripheral surfaces 40 of the rings 6 for the row b contact the raceway 28 for the other cup 4. The tapered surfaces 40 of the rings 6 also contact the tapered raceways 18 of the cone 2. The taper of the raceways 18 on the cone 2 and the taper of the raceways 28 on the cup 4 effect a capture of the transfer rings 6 for the two rows a and b and hold the rings 6 of each pair together against the spreading force exerted by the spring 50 and by the balls 48 which are captured in the pockets 46. As a consequence, the transfer rings 6 of any pair do not experience significant axial movement within the annular space between the cone 2 and the cups 4, yet remain under a preload imparted by the springs 50. Actually, a minute axial displacement of the loose rings 6 in the row a relative to the fixed rings 6 in the row b does occur, but this displacement only serves to drive the tapered peripheral surfaces 40 of the transfer rings 6 more tightly against the tapered raceways 18 and 28 of the cone 2 and cups 4 and this of course retards slippage. Indeed, when the torque transmitted by the transfer rings 6 of the two rows a and b differs, the balls 48 ride up the conical surfaces of the pockets 46 and urge the rings 6 of the row a away from the rings 6 of the row b.

One way to effect a difference in the torque that is applied to the transfer rings 6 of the several pairs is to orient the raceways 28 for the two cups 4 at slightly different angles (FIG. 4). For example, the raceway 28 which the transfer rings 6 of the row b contact may be at a steeper angle z than the raceways 28 which the rings 6 of the row a contact (FIG. 4—angles exaggerated for purposes of illustration). Of course, the corresponding raceways 18 of the cone 2 and corresponding peripheral surfaces 40 for the rings 6 are likewise oriented at different angles. By reason of the difference in the inclination of the raceways 18 and 28, the spreading force S exerted by the spring 50 on any pair of transfer rings 6 resolves into normal forces N of different magnitudes. Because the raceway 28 for the row b lies at a steeper angle than the raceway 28 for the row a, the normal force N along the raceway 28 for the row b is less than the normal force N for the raceway 28 along the row a. The coefficient of friction between the two transfer rings 6 of each pair and their respective raceways 28 remains essentially the same. Since the tangential force that actually effects a transfer of rotary motion between each ring 6 and the cup 4 along which it rolls is a function of the coefficient of friction and the normal force N, the tangential forces applied to the rings 6 of each pair will differ by reason of the variance in the normal forces N. As a consequence, the rings 6 of each pair experience different torques, at least at the point of slippage, and the balls 48 ride up the inclines of their respective pockets 46 and increase the spreading force S.

The transfer rings 6 and bearing 60 operate within a sealed environment. To this end, the rabbets 30 of the two cups 4 contain seals 72 (FIG. 2) which effect static fluid barrier with the cups 4 and live or dynamic fluid barriers with the peripheral surfaces of the end disks 52. In effect, the seals 72 close the narrow gaps between the cups 4 and the end disks 52 of the cage 10. The rabbets 20 at the ends of the cone 2 hold narrow ball bearings 74 which further fit into the end disks 52 and serve to maintain the end disks 52 concentric to the cone 2 in spite of relative rotation between the disks 52 and the cone 2 during the operation of the traction drive A. The bearings 74 contain seals 76 which form fluid barriers between the cone 2 and inner edge of the disks 52.

The drive unit A lends itself to several modes of operation. In one, torque is applied to the cone 2, while the cage 10 is held stationary. The cone 2 turns the transfer rings 6 which in turn rotate the cups 4. The cups 4 rotate at an angular velocity less than that of the cone 2, but in the same direction. Of course, when the torque is applied to the cups 4 with the cage 10 held fast, the cone 2 turns at a greater velocity in the same direction.

In the alternative, when the cups 4 are held stationary and the torque is applied to the cone 2, the cage 10 rotates in the direction opposite to that of the cone 2. On the other hand, the torque may be applied to the cage 10 and transmitted to the cone 2.

When the cone 2 is held stationary and the torque is applied to the cage 10, the cups 4 rotate in the same direction as the cage 10. Of course, torque may be applied at the cups 4 and delivered at the end cage 10.

A modified traction drive B (FIGS. 5 & 6) has a unitary cone 80 provided with two raceways 82 which are presented outwardly away from the center axis X. The cone 80 resembles the cone 2 of the drive A. The traction drive B also includes a pair of cups 84 each having a tapered raceway 86 that is presented inwardly toward the axis X. The cups 84 are separated slightly from each other at the center plane p of the drive B, and the raceways 86 taper upwardly toward the center plane p, that is to say, they have their greatest diameters at the center plane p. Each cup 84 has an outwardly directed flange 88 along the center plane p. The flanges 88 are captured between retaining rings 90 having inwardly directed flanges 92 which lie beyond the flanges 88 of the cups 84.

The one retaining ring 90 is slightly longer than the other—indeed, long enough to extend beyond the cup 84 which it encircles, and past the center plane p so that it also encircles a portion of the flange 88 on the other cup 84. This overlap serves to maintain the rings 90 in axial alignment.

The inwardly directed flanges 92 of the retaining rings 90 lie outside the outwardly directed flanges 88 of the cups 84, thus presenting opposite radial surfaces on the flanges 88 and 92. Here the flanges 88 and 92 have alternating spring pockets 94 and ball pockets 96. The two rings 90 and the cups 84 which are captured within them are held together with machine screws 98 which extend through their flanges 88 and 92 at the spring pockets 94. Indeed, the screws 98 are shouldered and threaded at each end such that they hold the two retaining rings 90 in fixed position with respect to each other, but of course allow for axial displacement of the cups 84 within the rings 90. The spring pockets 94 contain coil-type compression springs 100 which act against the flanges 88 of the cups 84 and the flanges 92 of the rings 90 to urge the two cups 84 together. The ball pockets 96, on the other hand, possess conical configurations and contain balls 102 which bear against their conical surfaces. The balls 102, being engaged with their cups 84 and rings 90 at the conical ball pockets 96, prevent rotation of the cups 84 with respect to the retaining rings 90—at least rotation of substantial magnitude. They further serve to engage the cups 84 and their respective retaining rings 90 so that torque will transfer between them. Nevertheless the balls 102 permit a slight rotational displacement between the cups 84 and the retaining rings 90, and owing to the conical configuration of the ball pockets 96, this serves to drive the cups 84 together. In this regard, the machine screws 98 pass through the flanges 88 of the cups 84 with a slight clearance to accommodate a slight rotational displacement.

The annular space between the cone 80 and the two cups 84 is occupied by transfer rings 110 and also by a cage 112 for maintaining the proper spacing between the transfer rings 110. Each ring 110 has a peripheral surface 114 which is slightly crowned such that it tapers downwardly on each side of the center plane p. As a consequence of the crown, the peripheral surface 114 contacts the raceways 82 and 86 of the cone 80 and cups 84, respectively, along narrow elliptical points or regions of contact. The transfer rings 110 have hollow interiors which contain ball-type antifriction bearing 116.

The cage 112 includes two end disks 118 which are located between the cone 80 and cups 84 with their outside faces flush with the ends of the cone 80 and cups 84. The two end disks 118 are separated by studs 120 which pass through and support the bearings 116 on which the transfer rings 110 revolve about remote axes Y. The studs 120 are fastened to the end disks 118 with machine screws 122.

Figure 7:
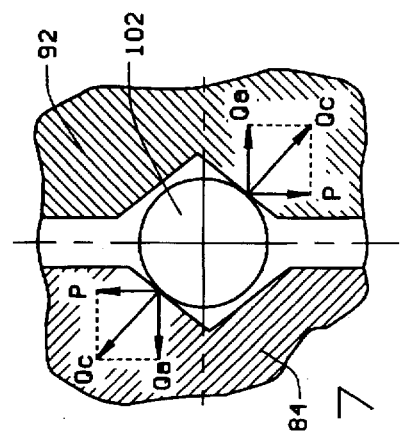
FIG. 7 is a fragmentary sectional view showing the forces which act within the modified drive to effect high torque transfer.

The traction drive B operates very similar to the traction drive A, except the difference in torque experienced by reason of the variation in tapers on the two sides of the transfer rings 110 manifests itself in a slight rotation of the one cup 84 relative to the other cup 84, and this has the effect of driving the cups 84 together. More specifically, when transferring torque between the cups 84 and the flange 92 of the retaining rings 90, a radial force R will produce an axial force Qa which provides more axial load on the transfer rings 110 (FIG. 7). This increases the traction capacity of the drive B.

This invention is intended to cover all changes and modifications of the example of the invention herein chosen for purposes of the disclosure which do not constitute departures from the spirit and scope of the invention.

What is claimed is:

1. A traction drive comprising: a cone having a pair of raceways which are located around a center axis and taper downwardly toward each other so that the raceways have their least diameters where they are closest; a pair of cups located around the cone and concentric to the cone about the center axis, each cup having a tapered raceway, with the raceway of the one cup being located opposite one raceway of the cone and the raceway of the other cup being located opposite the other raceway of the cone, the raceways of the two cups having their greatest diameters where they are closest; transfer rings located between the cone and cups and having peripheral surfaces which are tapered and contact the raceways of the cone and the cups; and a cage having annular end disks located beyond the ends of the transfer rings and are also located between the cone and the cups such that the end disks are exposed at the ends of the traction drive but do not project axially beyond the cone or the cups, the cage also having axles located between and attached to the disks, the axles extending through the transfer rings to establish remote axes about which the rings revolve, the cage further having bearings located within the transfer rings and around the axles to enable the transfer rings to rotate about the remote axes.

2. A traction drive according to claim 1 wherein the cone is unitary.

3. A traction drive according to claim 2 wherein the cups are separable; and further comprising connecting elements engaging the cups and preventing them from separating.

4. A traction drive according to claim 3 wherein the outside faces of the end disks and the ends of the cone and cups are generally flush.

5. A traction drive according to claim 3 wherein the transfer rings lie in two rows, with the transfer rings of the one row contacting the raceway of the one cup and the corresponding raceway on the cone and the transfer rings of the other row contacting the raceway of the other cup and the corresponding raceway of the cone.

6. A traction drive according to claim 5 wherein the transfer rings are arranged in pairs, with each pair including a ring from each of the rows and revolving about one of the remote axes; and wherein springs urge the transfer rings of each pair apart.

7. A traction drive according to claim 5 wherein the peripheral surfaces of the transfer lines are also crowned.

8. A traction drive according to claim 7 wherein the transfer rings of the two rows have inclined surfaces, with the inclined surfaces of the rings in the one row facing the inclined surfaces of the rings in the other row; and further comprising separating elements captured between the rings of the two rows at the inclined surfaces and bearing against the inclined surfaces, so that when the rings of the one row transfer a torque different from the rings of the other row, the separating elements will tend to spread the rings of the two rows and urge them against the raceways of the cone and cups, with greater force.

9. A traction drive according to claim 8 wherein the raceway of the one cup is inclined relative to the remote axes at an angle which is different from the inclination of the raceway for the other cup relative to the remote axes, so that the transfer rings of the one row transfer torque of a different magnitude than the rings of the other row.

10. A traction drive according to claim 8 wherein the inclined surfaces form conical pockets in the transfer rings, and the separating elements are balls that lie within the conical pockets.

11. A traction drive according to claim 3 wherein each transfer ring is a unitary component having along its periphery a surface which tapers downwardly toward the ends of the ring, with the surface contacting the tapered raceways of the cups and the raceways of the cone.

12. A traction drive according to claim 11 and further comprising retaining rings which are joined together such that they cannot be spread apart and within which the cups are captured.

13. A tradition drive according to claim 12 and further comprising springs carried by the retaining ring and bearing against the cups such that the two cups are urged together and into contact with the tapered peripheral surfaces of the transfer rings along their raceways.

14. A traction drive according to claim 13 wherein the retaining rings and cups have opposed generally radially directed surfaces and inclined surfaces along those radially directed surfaces, with the inclined surfaces on the cups being located opposite to the inclined surfaces on the retaining rings; and further comprising separating elements located between the retaining rings and cups at the inclined surfaces and contacting the inclined surfaces, such that when the cups encounter torques of different magnitude and tend to undergo rotation relative to each other, the cups will be urged together to force their raceways into tighter contact with the tapered peripheral surfaces of the transfer rings.

15. A traction drive comprising: a unitary cone having a pair of raceways which are located around a center axis and taper downwardly toward each other so that the raceways have their least diameters where they are closest; a pair of separable cups located around the cone and concentric to the cone about the center axis, each cup having a tapered raceway, with the raceway of the one cup being located opposite one raceway of the cone and the raceway of the other cup being located opposite the other raceway of the cone; transfer rings located between the cone and cups and having peripheral surfaces which are tapered and contact the raceways of the cone and the cups; each transfer ring being a unitary component having along its periphery a surface which tapers downwardly toward the ends of the ring so as to have its greatest diameter between its ends, the surface contacting the tapered raceways of the two cups and the corresponding raceways of the cones; retaining rings joined together such that they cannot be spread apart and within which the cups are captured; springs carried by the retaining ring and bearing against the cups such that the two cups are urged together and into contact with the tapered peripheral surfaces of the transfer rings along the raceways of the cups, the retaining rings and cups having opposed generally radially directed surfaces and inclined surfaces along those radially directed surfaces, with the inclined surfaces on the cups being located opposite to the inclined surfaces on the retaining rings; separating elements located between the retaining rings and cups at the inclined surfaces and contacting the inclined surfaces such that when the cups encounter torques of different magnitude and tend to undergo rotation relative to each other, the cups will be urged together to force their raceways into tighter contact with the tapered peripheral surfaces of the transfer rings; and a cage having end disks located beyond the ends of the transfer rings and axles located between and attached to the disks, the axles extending through the transfer rings to establish remote axes about which the transfer rings revolve.

16. A traction drive according to claim 15 wherein the inclined surfaces are along conical pockets and the separating elements are balls which fit into the conical pockets.

17. A traction drive according to claim 15 wherein the angles of the raceways for the two cups differ.

18. A traction drive according to claim 15 wherein the peripheral surfaces of the retaining rings are also crowned.

19. A traction drive according to claim 1 and further comprising antifriction bearings fitted to end disks and the cone to maintain the end disks concentric to the cone.

20. A traction drive comprising: a cone having a pair of raceways which are located around a center axis and taper downwardly toward each other so that the raceways have their least diameters where they are closest; a pair of cups located around the cone and concentric to the cone about the center axis, each cup having a tapered raceway, with the raceway of the one cup being located opposite one raceway of the cone and the raceway of the other cup being located opposite the other raceway of the cone; transfer rings located between the cone and cups and having peripheral surfaces which taper downwardly toward the ends of the rings and contact the raceways of the cone and the cups; retaining rings joined together such that they cannot be spread apart and within which the cups are captured; sprigs carried by at least one of the retaining rings such that they urge the two cups together and into contact with the tapered peripheral surfaces of the transfer rings along their raceways; the retaining rings and cups have opposed generally radially directed surfaces and inclined surfaces along those radially directed surfaces, with the inclined surfaces on the cups being located opposite to the inclined surfaces on the retaining rings; separating elements located between the retaining rings and cups at the inclined surfaces and contacting the inclined surfaces, such that when the cups encounter torques of different magnitude and tend to undergo rotation relative to each other, the cups will be urged together to force their raceways into tighter contact with the tapered peripheral surfaces of the transfer rings; and a cage having end disks located beyond the ends of the transfer rings and axles located between and attached to the disks, the axles extending through the transfer rings to establish remote axes about which the transfer rings revolve.

* * * * *

UNITED STATES PATENT AND TRADEMARK OFFICE
CERTIFICATE OF CORRECTION

PATENT NO. : 5,688,201
DATED : November 18, 1997
INVENTOR(S) : Rao-Sheng Zhou

It is certified that error appears in the above-identified patent and that said Letters Patent are hereby corrected as shown below:

Claim 7, line 2, "lines" should be -- rings --

Signed and Sealed this

Twenty-fourth Day of March, 1998

BRUCE LEHMAN

*Attest:*

*Attesting Officer*     *Commissioner of Patents and Trademarks*